(12) United States Patent
Delin

(10) Patent No.: US 11,484,824 B2
(45) Date of Patent: Nov. 1, 2022

(54) METHOD FOR DETERMINING UTILIZED CAPACITY OF AN AIR FILTER

(71) Applicant: Blueair AB, Stockholm (SE)

(72) Inventor: Hadding Delin, Stockholm (SE)

(73) Assignee: BLUEAIR AB, Stockholm (SE)

( * ) Notice: Subject to any disclaimer, the term of this patent is extended or adjusted under 35 U.S.C. 154(b) by 1007 days.

(21) Appl. No.: 16/305,206

(22) PCT Filed: May 31, 2017

(86) PCT No.: PCT/SE2017/050579
§ 371 (c)(1),
(2) Date: Nov. 28, 2018

(87) PCT Pub. No.: WO2017/209684
PCT Pub. Date: Dec. 7, 2017

(65) Prior Publication Data
US 2020/0179857 A1    Jun. 11, 2020

(30) Foreign Application Priority Data

May 31, 2016    (SE) .................................... 1650759-2

(51) Int. Cl.
*B01D 46/00*    (2022.01)
*B01D 46/10*    (2006.01)
(Continued)

(52) U.S. Cl.
CPC ......... *B01D 46/0086* (2013.01); *B01D 46/46* (2013.01); *B01D 46/10* (2013.01);
(Continued)

(58) Field of Classification Search
CPC .... B01D 46/0086; B01D 46/10; B01D 46/46; B01D 46/429; B01D 46/442; F24F 8/10; F24F 2110/50
(Continued)

(56) References Cited

U.S. PATENT DOCUMENTS

| 5,711,785 A * | 1/1998 | Maxwell | B01D 46/444 |
| | | | 95/20 |
| 6,660,070 B2 * | 12/2003 | Chung | B01D 46/0086 |
| | | | 96/417 |

(Continued)

FOREIGN PATENT DOCUMENTS

| CN | 1235060 | 11/1999 |
| CN | 102938023 | 2/2013 |

(Continued)

OTHER PUBLICATIONS

Opposition Notice in corresponding European Patent Application No. EP17807116 and Patent No. EP346361, dated Jun. 9, 2022 (21 pages).

(Continued)

*Primary Examiner* — Minh Chau T Pham
(74) *Attorney, Agent, or Firm* — Carter, DeLuca & Farrell LLP; George Likourezos

(57) ABSTRACT

A method, an air treatment device and a system associated with determining a degree of utilized capacity of a filter for processing air present in an ambient volume. Determining a total accumulated pollutant amount in the filter. Comparing the determined total accumulated pollutant amount to a reference pollutant amount to determine the degree of utilized capacity. The reference pollutant amount is a pollutant amount present in the filter when the air treatment device produces a predetermined clean air flow. The accumulated pollutant amount in the filter is determined based on data obtained from a sensor arranged to measure a current pollutant concentration in the ambient volume and/or pollutant concentration data indicative of a current pollutant concentration in the ambient volume and an estimated volume of air processed by the air treatment device. The (Continued)

volume is estimated based on a current air flow through the filter.

13 Claims, 2 Drawing Sheets

(51) Int. Cl.
*B01D 46/44* (2006.01)
*B01D 46/46* (2006.01)
*F24F 8/10* (2021.01)
*F24F 110/50* (2018.01)
*B01D 46/42* (2006.01)

(52) U.S. Cl.
CPC .......... *B01D 46/429* (2013.01); *B01D 46/442* (2013.01); *F24F 8/10* (2021.01); *F24F 2110/50* (2018.01)

(58) Field of Classification Search
USPC ...... 55/385.2, 472, 473, DIG. 34; 95/25, 26; 96/397, 417, 422, 424
See application file for complete search history.

(56) References Cited

U.S. PATENT DOCUMENTS

| | | | | |
|---|---|---|---|---|
| 8,591,625 | B2* | 11/2013 | Iyengar | ................ B01D 46/10 96/417 |
| 10,510,110 | B2 | 12/2019 | Takahashi et al. | |
| 2007/0157819 | A1* | 7/2007 | Kang | ................ B01D 46/0086 96/417 |
| 2013/0197829 | A1* | 8/2013 | Sherman, III | ..... B01D 46/0086 702/45 |
| 2013/0289919 | A1* | 10/2013 | Wilson, Jr. | ......... B01D 46/0086 356/51 |
| 2014/0283682 | A1 | 9/2014 | Hamann et al. | |
| 2015/0241318 | A1* | 8/2015 | Hamann | ................ G01N 33/0004 702/34 |
| 2016/0068077 | A1 | 3/2016 | Smith et al. | |
| 2016/0123207 | A1* | 5/2016 | Aso | ........................ F01N 3/027 96/408 |
| 2016/0209316 | A1 | 7/2016 | Buseyne et al. | |
| 2016/0243486 | A1* | 8/2016 | Galsim | .................. F24F 13/28 |
| 2017/0102312 | A1* | 4/2017 | Miyairi | ................ G01N 15/082 |
| 2018/0348109 | A1* | 12/2018 | Roth | ..................... F01N 3/0232 |
| 2020/0179857 | A1 | 6/2020 | Delin | |
| 2020/0224550 | A1* | 7/2020 | Dischinger | ............. F01D 21/10 |

FOREIGN PATENT DOCUMENTS

| | | |
|---|---|---|
| CN | 103994559 | 8/2014 |
| CN | 104180474 | 12/2014 |
| CN | 104390322 | 3/2015 |
| CN | 104633848 A | 5/2015 |
| CN | 104819545 | 5/2015 |
| CN | 104819545 A | 8/2015 |
| CN | 105180368 | 12/2015 |
| CN | 105180368 A | 3/2016 |
| CN | 105363297 | 3/2016 |
| CN | 105606512 A | 5/2016 |
| EP | 2105677 A1 | 9/2009 |
| EP | 3048382 A1 | 7/2016 |
| JP | 1993317625 | 12/1993 |
| JP | H11156131 | 6/1999 |
| JP | 2008136976 | 6/2008 |
| JP | 2009511268 | 3/2009 |
| JP | 2015028760 A | 2/2015 |
| JP | 2015213987 | 12/2015 |
| JP | 2016074013 | 5/2016 |
| JP | 2017080707 | 5/2017 |
| JP | 2019517917 A | 6/2019 |
| JP | 2021105508 A | 7/2021 |
| KR | 20070075304 | 7/2007 |
| SE | 1151219 A1 | 7/2016 |
| WO | WO2015028760 | 3/2015 |
| WO | WO2016096786 | 6/2016 |
| WO | WO2016107077 | 7/2016 |
| WO | WO2017126146 | 5/2018 |
| WO | WO2017055112 | 8/2018 |

OTHER PUBLICATIONS

Search Report and Written Opinion in EP17807116.; dated Dec. 19, 2019.
International Search Report to corresponding International application PCT/SE2017/050579 dated Aug. 2, 2017.
International Preliminary Report on Patentability dated Dec. 4, 2018, for Corresponding PCT Application No. PCT/SE2017/050579 (8 pages).

* cited by examiner

METHOD FOR DETERMINING UTILIZED CAPACITY OF AN AIR FILTER

TECHNICAL FIELD

The present specification generally relates to the field of air treatment devices and in particularly discloses a method for determining a degree of utilized capacity of a filter arranged in an air treatment device. The present specification also relates to an air treatment device and a system comprising an air treatment device and a server.

TECHNICAL BACKGROUND

Air treatment devices are used for treatment of indoor air, for example cleaning of indoor air. A conventional air treatment device normally comprises an air treatment section adapted to remove pollutants from an air stream guided through the device.

The air treatment section commonly comprises one or more filters of suitable types, commonly referred to as air filters or air treatment filters, where examples include filters adapted for filtering the air stream from particles as well as filters adapted to remove gaseous pollutants. One example from the first group of filter is non-woven polypropylene particle filters, filtering out particulate matter of various sizes. One example from the latter group is so called activated carbon filters, comprising activated carbon pellets in order to filter out gaseous pollutants. Further, combined filters are known which may utilize both techniques described above. For example, a combined filter may comprise activated carbon pellets, and a particle filtration media for example such as the particle filters described above.

Typically, the air treatment section in such devices further comprises a fan for generating the air stream to be treated by the air treatment section, this air stream is induced, or pushed, through the filter allowing the filter to remove the particle or gaseous pollutant in the above described cases.

As the air treatment device is being used, the filters become loaded with pollutants which in turn cause the production efficiency, i.e. the clean air production efficiency, of the air treatment device to decrease. Therefore, in order to guarantee a satisfactory clean air delivery rate, regular filter change is needed.

One solution to this problem known in the art is to provide the user with information either when purchasing the air treatment device and/or the filter to change the filter at regular intervals, for example every six month. This may however be easily forgotten or overseen by the user, and a less satisfactory indoor environment may result, wherein the air may for example comprise a higher pollutant concentration than desired.

In order to alleviate some of these drawbacks, attempts have been made to use a timer arranged in the air treatment device, preferably combined with means adapted to indicate a need for a filter change to a user. Such devices include for example a light turning on after a predetermined time, for example the six months' period as for the exemplary case described above.

However, depending on the environment in which the air treatment device is used, the predetermined time period may be too long in the case of an operating environment having severely polluted air or in some cases too short in the case of an operating environment having unusually clean air. Accordingly, the filter change may take place too early or too late, depending on the operating case, hereby causing unnecessary costs in the case of cleaner air than foreseen or providing a non-satisfactory air quality in the opposite case of an environment where the air is severely polluted.

SUMMARY OF THE INVENTION

Accordingly, it would be desirable to provide a method for increasing the accuracy of filter life time prediction to for example be able to provide information to a user when to change the filter with greater precision. In particular, it would be desirable to provide a way of predicting filter change such that the capacity of the filter may be utilized to an appropriate extent. To better address one or more of these concerns a method, an air treatment device and a system as defined in the independent claim are provided. Preferred embodiments are defined in the dependent claims.

According to a first aspect of the invention, a method for determining a degree of utilized capacity of a filter arranged in an air treatment device adapted to process air present in an ambient volume is provided. The air treatment device comprises a fan adapted to induce an air flow drawn from the ambient volume through the filter. The method comprises the steps of determining a total accumulated pollutant amount in the filter and comparing the determined total accumulated pollutant amount to a reference pollutant amount to determine the degree of utilized capacity. The accumulated pollutant amount in the filter is determined based on data obtained from a sensor arranged to measure a current pollutant concentration in the ambient volume or pollutant concentration data indicative of a current pollutant concentration in said ambient volume and an estimated volume of air processed by the air treatment device, the volume being estimated based on current air flow through the filter.

According to the first aspect, the method provides an inventive solution to the concerns described above by means of at least the step of determining a pollutant amount present in the filter and comparing the value to a reference pollutant amount. Such a reference pollutant amount, or quantity, may for example represent an amount of pollutants which may be present in the filter when the performance of the air treatment device and/or the filter reaches a minimum acceptable performance level, i.e. a minimum level deemed acceptable before the filter has to be changed. Accordingly, the resulting determination, or estimation, gives the ratio, or degree, of capacity utilized with regards to a reference level for example representing a level of pollutant loading, i.e. an amount or quantity of pollutants present in the filter, where one example of such an amount or quantity is a mass of pollutants, when the filter has to be changed. Consequently, as the amount of pollutants in the filter approaches the reference value, the degree, or ration, approaches 1 or a 100% or similar. This reference value may differ depending on the application and/or environment in which the air treatment device is utilized. For example, higher demands may be present in certain environment requiring the filter to be changed at an earlier stage corresponding to a smaller pollutant amount present in the filter, whereas in other environments cost-efficiency may have a higher priority and the filter may be utilized for a longer period of time, i.e. allowed to accumulate a larger amount of pollutants before a filter change may be due.

This is particularly relevant in order to be able to provide a possibility to reliably predict a current degree of utilized capacity of a filter, based on the actual operating conditions of that particular filter, and even more so for taking the effect of for example variable operating conditions into account.

For example, with regards to known prior art solutions, most air treatment device that notify the user of when to change filter determine the time to notify the user using a timer. This is however a rather blunt manner of determining the life time, since the life time is off course to a large extent dependent on the actual operation conditions which are not always easily foreseen at the time of delivery.

Further, whether timers are used or not, the recommended filter change interval varies significantly depending on the type of air treatment device and/or the manufacturer. Although the life time is off course dependent on the type of system and/or filter type, the perception on when a filter is too loaded varies significantly between manufacturers. These differences of opinion, which may be based on subjective opinions of the manufacturers or in some cases are even due to lack of knowledge, imposes a further factor of uncertainty to the field of filter life time estimation.

However, due to the inventive utilization of sensor data relating to the actual operating conditions or pollutant concentration data indicative of a current pollutant concentration in said ambient volume and carefully chosen reference data, these factors of uncertainty as well as the need for estimations based on subjective opinion are eliminated. Accordingly, advantages of the invention include that the accuracy of filter lifetime prediction may be significantly increased and further that the actual operating conditions of the filter may be taken into account. Hence, known problems relating to estimations based on insufficient facts and/or subjective opinions, hereby securing that the capacity of the filter may be utilized to an as great extent as possible.

The filter referred to in the first aspect above may be for example one or more filters adapted for filtering the air stream from particles as well as one or more filters adapted to remove gaseous pollutants, or both. Example include non-woven polypropylene particle filters, filtering out particulate matter of various sizes, HEPA-filters representing a common type, so called activated carbon filters and combined filters utilizing both techniques. Any other suitable filter is however conceivable within the scope of the presented aspects.

Non-woven polypropylene particle filters belong to a common type of filters adapted to remove particulate matter such as dust or pollen known as fibrous filters, i.e. filters comprising fibrous materials in which particles are trapped and removed from the air. The fibres may be randomly arranged. As the air stream flows through the filter the particles get trapped, or stuck, to the fibres. Consequently, as the air treatment device is used, the filter becomes loaded with particles, until eventually reaching an end of life time.

Such filters are however not designed to filter out for example gases or other small molecules such as so called volatile organic compounds (VOC), examples of VOCs that are present in indoor environments are toluene, formaldehyde, xylene and benzene molecules. VOCs are of a different, smaller, size range than particles, and other filtration methods are therefore necessary for collecting them. The active carbon filters constitute one common way to provide such filtration utilizing activated carbon granulates, to accomplish the mass transfer and diffusion needed for the adsorption of the VOCs.

When the filter has trapped enough VOC, its efficiency will eventually drop, this in turn determining a life length of the filter. This is sometimes referred to as saturation.

The reference pollutant amount value may in some embodiment be a value representing a maximum pollutant amount allowed to be present in the filter, i.e. a pollutant amount such that the filter may be regarded as having reached its maximum lifetime when having trapped, i.e. removed from the air, the specified amount.

The reference pollutant amount value may further be obtained from a test, or be a value obtained from a filter supplier or manufacturer such as from a filter loading specification value and/or a value obtained from a standardized test.

In some embodiment, the method further comprises the step of setting, or adjusting, the reference value.

Sensor data may be received from one or more sensors arranged to measure the pollutant concentration in the ambient volume of which the air treatment device is adapted to process air. The pollutant concentration may in some embodiments be an average pollutant concentration. The sensor may in some embodiments be arranged in or on the air treatment device. In some embodiments, the sensor is arranged at an inlet of the air treatment device, i.e. where the air enters the air treatment device. In some embodiments, the sensor is arranged at an outlet of the air treatment device. The sensor is commonly arranged upstream with respect to the filter, but may in some embodiments be arranged downstream. Some embodiment comprises an externally arranged sensor; such a sensor may communicate with the air treatment device by means of a wired or a wireless connection.

Sensors adapted to measure an average pollutant concentration are as such generally known in the art and will not be described in detail. The sensor may however be any kind of sensor adapted to measure pollutants such as a particle sensor, where examples include optical sensors comprising infrared emitting diodes and the like, and/or a gas sensor adapted to measure for example VOC concentrations.

As an alternative to use sensor data, pollutant concentration data indicative of a current pollutant concentration representative for the geographical area, i.e. pollutant concentration data representative of the outdoor conditions surrounding the ambient volume, where the air purifier is located could be used in the method. The pollutant concentration data could be provided from an external information provider that is collecting and storing pollutant concentration data for a number of different geographical areas and transferring the information to the air treatment device in which the information is used in the method according to the invention.

Furthermore, the method could involve the use of both data obtained from a sensor arranged to measure a current pollutant concentration in the ambient volume and pollutant concentration data indicative of a current pollutant concentration in said ambient volume to determine the actual pollutant amount present in the filter. The combination of data from the sensor and pollutant concentration data representative of the outdoor conditions surrounding the ambient volume further improves the accuracy of the method.

The air treatment device further comprises a fan, or a fan unit, suitable types of fans include radial and axial fans. Fans are however well known in the art and will not be described as such in further detail. Any other suitable means adapted to create, or induce, a flow of air, particularly through said air filter are however conceivable within the scope of the present invention. Further, other exemplary means for treatment of air that may be comprised by the air treatment device including electrical means for air treatment using electrostatic effects to attract particles and devices using ultraviolet radiation and/or ionization. Some embodiments may include means for humidification of air.

In general, the method may use data from the sensor arranged to measure a current average pollutant concentration and/or pollutant concentration data provided from an external source, and an estimation of the processed volume of air to determine an accumulated particle amount in the filter, wherein this accumulated amount may be compared to a reference pollutant amount to estimate the degree of utilized capacity of the filter.

In one embodiment, the volume of air is estimated based on a value indicative of a current clean air flow through said filter.

In one embodiment, the method may be executed by means of an iterative process over time. In some embodiment, for such an iterative method, at least one of the steps according to the first aspect of the invention may be performed over a plurality of sample periods.

For example, according to one embodiment, the estimated volume of processed air may be estimated over a certain period of time by means of a multiplication of said value indicative of the current air flow through said filter and a length of said period of time.

In one embodiment, the time period of such a sample period may be calculated by subtracting the time of the previous sample from a known current time. Further, the accumulated pollutant amount during such a sample time may in some embodiment be calculated by multiplying the current average pollutant concentration with the sample time and the current air flow of the air treatment device.

An accumulated pollutant amount in the filter over a number of sample period may accordingly be determined by means of an addition of the respective accumulated pollutant amount over all sample periods.

In other words, in some embodiments, the step of determining an accumulated particle mass over a sample period comprises the steps of obtaining a length of the first sampling period, obtaining a first value indicative of the current average particle concentration at a time t, t belonging to the first sampling period, obtaining a second value indicative of the current air flow through the filter at time t; and multiplying the obtained values.

Further, the step of determining a total accumulated particle mass may in some embodiments comprise the steps of adding a plurality of accumulated pollutant amount over a plurality of sample periods.

Accordingly, expressed at a time T and a sampling period t, in some embodiments, a method for determining a degree of utilized capacity of a filter arranged in an air treatment device adapted to process air present in an ambient volume, at a time T, is provided, wherein said air treatment device comprises a fan adapted to induce an air flow drawn from said ambient volume through said filter. The method comprises the steps of determining a total accumulated particle mass in the filter up to time T by means of determining a first particle mass accumulated in the filter over a first sampling period t, t being smaller than or equal to T and adding together said determined first particle mass and a known particle mass accumulated in the filter over the time period T-t, wherein said stored accumulated particle mass is an accumulated mass determined over at least one sampling period, said sampling period being smaller than or equal to T-t, and comparing the determined total accumulated particle mass to a reference value to determine degree of utilized capacity, wherein the step of determining an accumulated particle mass over a sampling period comprises the steps of obtaining a length of said sampling period, obtaining a first value indicative of the current average particle concentration at a time ts, ts belonging to said sampling period, obtaining a second value indicative of the current air flow through said filter at time ts and multiplying the obtained values.

According to one embodiment, the reference pollutant amount is a pollutant amount present in said filter when said air treatment device processes air at a predetermined rate of production of clean air. The predetermined rate may in some embodiments be a predetermined minimum rate of production of clean air.

In other words, according to one embodiment, the reference pollutant amount is a pollutant amount present in said filter when said air treatment device produces a predetermined clean air flow, i.e. a predetermined clean air flow rate. In some embodiments, the clean air flow is a clean air flow through said filter. This may in some embodiments be referred to as an amount present in said filter when said air treatment device induces a predetermined amount of clean air through said filter.

According to one embodiment, the reference pollutant amount is a pollutant amount present in said filter when said air treatment device processes air at a predetermined minimum clean air delivery rate level.

The clean air delivery rate (CADR), i.e. the rate at which the treatment device produces clean air, is a commonly used performance measurement for air treatment devices. More specifically, the CADR is a measurement of the volume of air that has had a given degree, or percentage, of the particles of a given size distribution removed and accordingly provides information of the combined effect of the air treatment device with regards to both the air flow through the device and the filter efficiency. In other words, the CADR is the relative reduction by the air cleaner of particulate matter suspended in the air in a specified test chamber. This performance measurement is defined by AHAM (Association of Home Appliance Manufacturers) in the U.S. standard; ANSI/AHAM AC-1. This standard defines the CADR for particulate matter, i.e. particles such as for example dust and pollen particles.

The CADR is also used in the new Chinese standard GB/T 18801, which is modelled after AC-1, but also adds CADR measurements for formaldehyde representing VOCs.

According to one embodiment, the reference pollutant amount value is a pollutant amount value obtained by means of a loading test of the filter. Such loading test may for example be designed to test the performance of the filter and/or the air treatment device over time as pollutants accumulate in the filter.

According to one embodiment, the reference pollutant amount value is a pollutant amount value obtained by means of an accelerated pollutant loading test of said filter. Such tests are designed to test the performance of the filter in an accelerated manner and may thus be particularly advantageous for example in that results may be achieved in a shorter amount of time. Examples include testing an air treatment device comprising a filter and/or a filter in an environment where the air has an unusually high pollutant content.

One specific example of an accelerated pollutant loading test is the new measurement called Cumulative Clean Mass (CCM), defined in the Chinese standard GB/T 18801 mentioned above. During this test, the air treatment device is loaded with either cigarette smoke or formaldehyde at an accelerated rate. Meanwhile, CADR measurements are carried out at a certain rate and the CCM is calculated. Accordingly, the CCM value may be described as a pollutant amount which may be present in the filter, given a certain CADR-level of the air treatment device.

According to one embodiment, the reference pollutant amount value is a CCM pollutant amount value. Further, according to one embodiment, the reference pollutant amount value is a CCM pollutant amount value at a specified CADR level. The CCM value may be a CCM value of a specific air treatment device and specific filter.

According to one embodiment, the reference pollutant amount value is a pollutant amount value obtained by means of a long-time pollutant loading test of said filter. Long-time testing may in some cases be advantageous for example in that testing conditions may be made to model the actual operating conditions more closely.

Method according to any of the preceding claims, wherein the value indicative of the air flow through the filter is obtained by means of an estimation at least in part dependent on a value indicative of a current accumulated pollutant amount in the filter.

One such example includes an estimation wherein the flow data used for approximating airflow during filter loading is taken from a CCM tests, the flow data corresponding to the current accumulated pollutant amount. In other words, in some embodiments, CADR values may be used for this purpose. Use of other test data is equally possible.

According to one embodiment the value indicative of a current air flow through said filter is obtained by means of an estimation based on a reference air flow through said filter, the reference flow being a flow through the filter when substantially no particles are present in the filter and an airflow decrease factor corresponding to said current accumulated particle mass in said filter, wherein the airflow decrease factor is a factor indicative of a reduction of the air flow through said filter due to the amount or quantity of particles present, for example expressed as the particle mass, in said filter.

The airflow decrease factor may in some embodiments be calculated using a specific formula for each air treatment device and filter. This formula may be obtained by means of a curve fit to data representing the flow decrease when the filter is loaded with particles, examples include a quadratic or a cubic fit. Accordingly, the airflow decrease factor may be a formula value.

According to one embodiment, the value indicative of a current air flow through said filter is obtained by means of an estimation based on fan speed.

According to one embodiment, the value indicative of the air flow through said filter is obtained by means of data from a sensor arranged to measure said air flow. Such a sensor may provide an advantageous exact measurement of the current air flow. Examples of air flow sensors include adapted mass flow meters. The sensor may in some embodiment be arranged upstream of the filter, in some embodiment the sensor may be arranged downstream of the filter.

According to one embodiment, the value indicative of air flow through the filter is obtained by means of data indicative of the performance of the fan. Examples of such data include, but are not limited to, angular velocity data, RPM data and energy consumption of the fan.

According to one embodiment, the pollutant amount is a particle amount. Examples include dust and pollen. According to one embodiment, the pollutant amount is a gaseous pollutant amount. Examples include VOCs. According to one embodiment, the pollutant amount comprises at least one of a particle amount and a gas molecule amount.

According to one embodiment, the value indicative of the current average pollutant concentration is a particulate matter concentration value. One example is a PM2.5-value. According to one embodiment, the value indicative of the current average pollutant concentration is a VOC-concentration value. According to one embodiment, the value indicative of the current average pollutant concentration is at least one of a particulate matter concentration value and a VOC-concentration value.

PM and VOC values are important measurements for determining the indoor air quality. For PM the most well-known and commonly used measurement is PM2.5, i.e. the mass of all the collected particles smaller than 2.5 µm in diameter. VOC measurements on the other hand, are more complex, since there are so many pollutants under the umbrella designation, which pollutants are measured in different ways and exist in different concentrations a common VOC, formaldehyde, is often used to represent VOC in tests.

According to one embodiment, the method further comprises the step of determining a remaining filter lifetime, i.e. the days remaining before a filter change, wherein the determination of remaining life time is based on the assumption that said current average pollutant concentration level remains substantially constant during the estimated remaining life time.

Since the degree of utilized capacity is known from the comparison of the total accumulated mass to the reference value, for example a CCM value of the specific filter and air treatment device, the remaining filter lifetime may be determined based on the assumption that the pollutant concentration remains constant. In one embodiment, this determination comprises the steps of estimating a remaining filter lifetime by means of a multiplication of the current operating time and the inverse of the ratio of the total accumulated mass to the reference value followed by a subtracting of the current operating time.

The method according to any of the embodiments of the first aspect may further comprise a further step of communicating the degree of utilized capacity and/or the remaining filter lifetime to a user. Hereby the user may be notified to change the filter, an/or in advance in order to prepare for a filter change. This may in some embodiments be performed by means of an indication on the air treatment device, utilizing a suitable user interface. In other embodiments, the indication may be provided by remote means in communication with the air treatment device such as a smart phone.

In other embodiments, the degree of utilized capacity and/or the remaining filter lifetime may be communicated instead to a provider of air treatment device and/or filters, such that a new filter may for example be sent to a user when a filer change approaches.

According to one embodiment, the pollutant concentration data indicative of a current pollutant concentration in said ambient volume is concentration data representative for a geographical area where the air treatment device is located. If the available information regarding pollutant concentration data for the geographical area where the air treatment device is intended to be used is of high accuracy, this embodiment is favourable since the need for a sensor in the air treatment device is eliminated which reduces the complexity of the device and in the end the overall price for the device.

According to one embodiment, the concentration data is collected by an external information provider and transferred to the air treatment device, alternatively manually provided loaded into the air treatment device.

According to a second aspect of the invention, an air treatment device adapted to process air present in an ambient volume and further adapted to receive a filter is provided. The air treatment device comprises a fan adapted to induce an air flow drawn from said ambient volume through said filter and circuitry, wherein the circuitry is adapted to execute at least one step of a method according to any of the embodiments described in the foregoing.

Such circuitry may include a controller, for example a so called micro controller unit (MCU), adapted to execute the method according to any of the embodiments described in the foregoing.

In one embodiment, the air treatment device further comprises a sensor arranged to measure an average pollutant concentration in said ambient volume. In one embodiment, the air treatment device further comprises means for receiving data from an externally arranged sensor arranged to measure an average pollutant concentration in said ambient volume.

The air treatment device may further comprise a user interface such as a graphical user interface, for example a display device such as a liquid crystal (LCD) display, or in more simple embodiments for example LEDs guiding the user for example to indicate a need for a filter change, an upcoming filter change and/or to display a remaining filter lifetime, for example days remaining until filter change. Any selections or adjustments by the user may be performed using conventional means such as a button, knob or touch button manoeuvred by the user. Other embodiments may comprise the user interacting with touch- or pressure-sensitive areas of the interface, or screen. Yet other embodiments may comprise a non-touch sensing means for selections or adjustments.

Further objectives, advantages and features of the air treatment device conceivable within the scope of the second aspect of the invention are readily understood by the foregoing discussion referring to the first aspect of the invention.

According to yet another aspect of the invention, a system comprising an air treatment device and a server is provided. The air treatment device is adapted to process air present in an ambient volume and to receive a filter, and comprises a fan adapted to induce an air flow drawn from said ambient volume through said filter and circuitry. At least one of the circuitry and the server is adapted to execute at least one step of a method according to any of the embodiments described in the foregoing.

Accordingly, any calculations or the like required may be performed by the circuitry of the air treatment device and/or by the server. Further, in some embodiments, input data for the method of the previous embodiments is stored on the server. Such data include among others data related to time, CCM-data for the specific filter and the like. In other embodiments, such data may be stored internally in the air treatment device.

In one embodiment, the air treatment device further comprises a sensor arranged to measure an average pollutant concentration in said ambient volume. In one embodiment, the system further comprises a sensor arranged to measure an average pollutant concentration in said ambient volume, the air treatment device further comprising means for receiving data from said sensor.

Further objectives, advantages and features of the system conceivable within the scope of the third aspect of the invention are readily understood by the foregoing discussion referring to the first and second aspects of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and non-limiting detailed description of preferred embodiments, with reference to the appended drawings, in which.

All figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
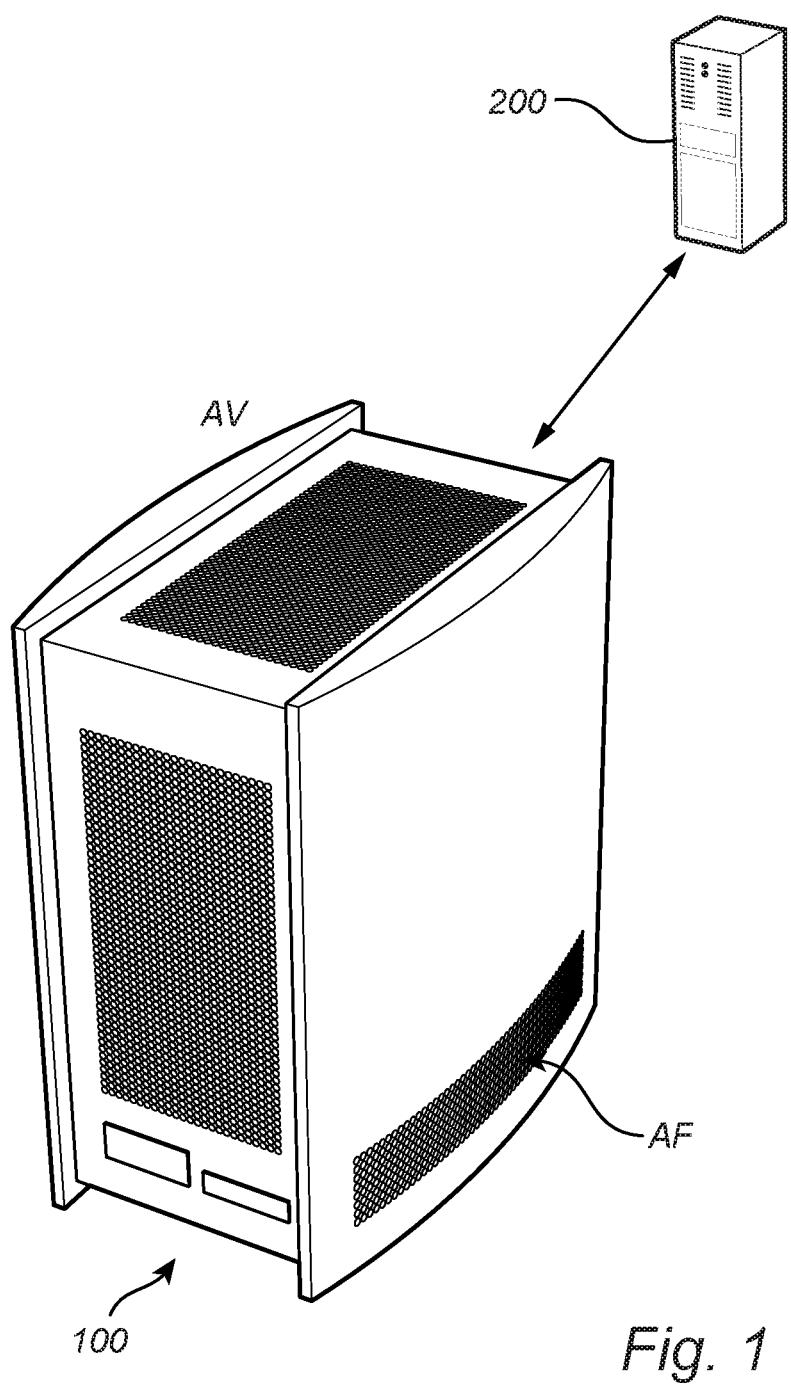
FIG. 1 is a schematic illustration of a system according to an aspect of the invention.

FIG. 1 is a schematic illustration of a system according to an aspect of the present invention comprising an air treatment device 100 and a server 200, a filter 300 (not shown) is arranged in the air treatment device 100. The air treatment device is adapted to process air present in an ambient volume AV and comprises a fan 110 adapted to induce an air flow AF drawn from said ambient volume AV through said filter 300 and circuitry 120 (none of which are shown). A sensor (not shown) is arranged to measure a current average pollutant concentration in the ambient volume AV. Alternatively the air treatment device comprises means for communication with an external unit that is configured to send information regarding pollutant concentration data for the geographical are where the device is used. The information could be sent for example by WIFI to the air treatment device.

A further embodiment of the air treatment device comprises a user interface that makes it possible to manually provide the desired information regarding pollutant concentration data for the particular location where the air treatment device is arranged to further reduce the complexity of the product. The circuitry and/or the server is adapted to execute at least one step of a method for estimating a utilized capacity of the filter, and further to estimate a remaining filter lifetime based on the utilized capacity.

The method will now be described in detail in the following with reference to FIG. 2. In the exemplary embodiment described herein, the current pollutant concentration is a particle concentration provided by means of PM2.5 values from a particle sensor, the estimated volume is estimated based on air flow, whereas the reference value is a CCM particle mass value.

The skilled person however realizes that the current average pollutant concentration may be just as easily be provided by means of for example a current average VOC concentration from a gas sensor, in which case the reference value may be a VOC concentration value.

The utilized capacity of the filter is determined by performing the steps of determining a total accumulated pollutant amount in the filter 400 and comparing the determined total accumulated pollutant amount to a reference pollutant amount to determine the degree of utilized capacity 500. In step 400 the accumulated pollutant amount in the filter is determined based on data obtained from a sensor arranged to measure a current average pollutant concentration in the ambient volume and an estimated volume of air processed by the air treatment device, the volume being estimated based on a current air flow through the filter.

In the exemplary case described, the method is further performed by means of an iterative process over time.

Accordingly, step 400 is performed repeatedly over a plurality of sample period, such that a total accumulate particle mass over a time T may be determined by means of a summation over a number of sample periods t, t commonly being smaller than T.

Figure 2:
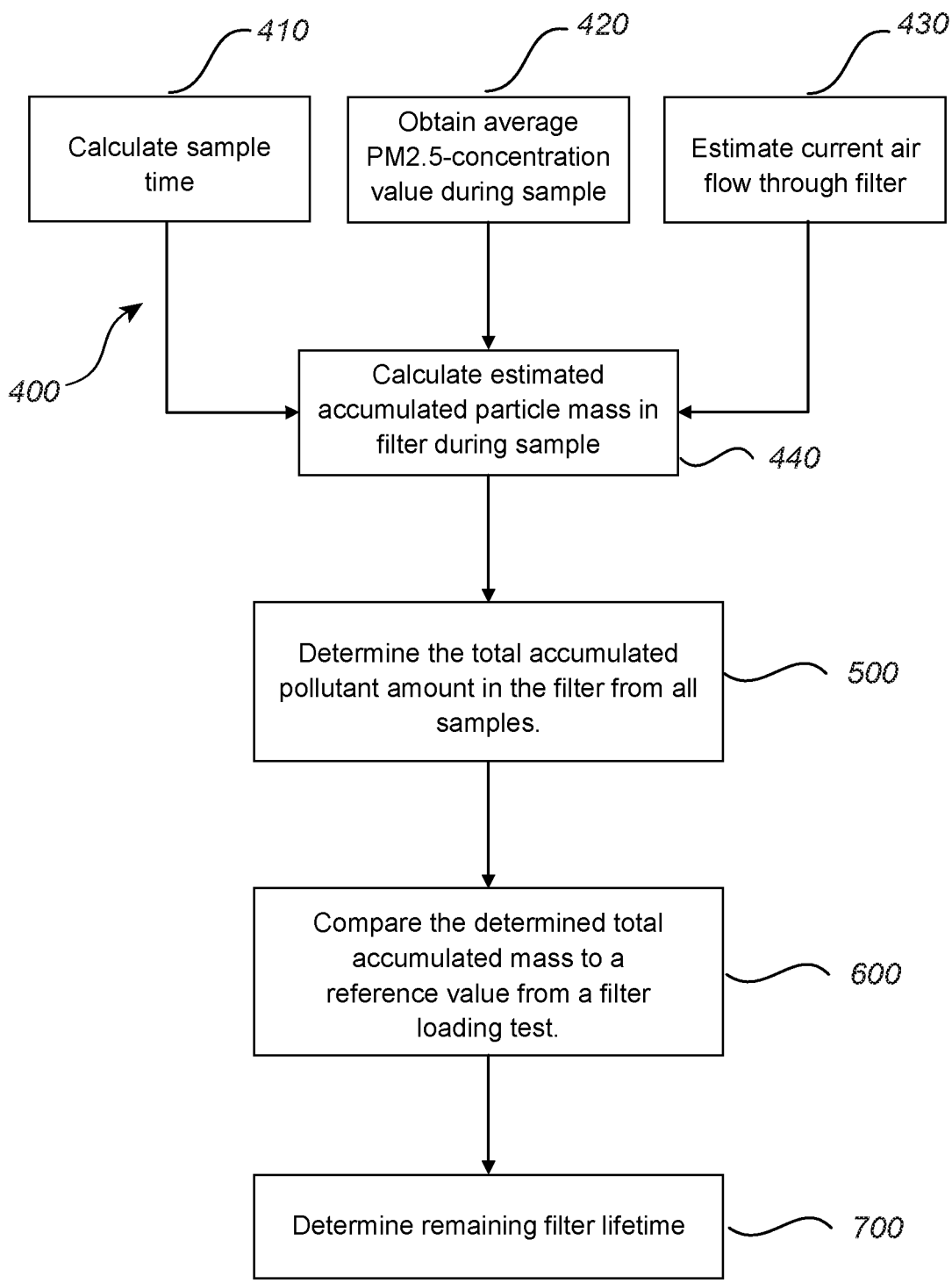
FIG. 2 is a flow chart schematically illustrating a number of steps of a method according to one embodiment.

As illustrated in FIG. 2, step 400 further comprises a number of sub steps which will be described in the following.

In a first sub-step 410, the sample time t is calculated by subtracting the time of the previous sample from the current time. This value is then converted into hours.

In a second sub-step 420, a PM2.5 value representing the current average particle concentration is obtained from the particle sensor. By the term current particle concentration may be understood a particle concentration obtained during the current sample period.

In a third sub step 430 the current air flow is estimated using an air flow decrease factor obtained by a specific formula for each air treatment device and filter. This formula is fitted to data representing the flow decrease as the filter gets loaded with particles, for example by means of a quadratic or cubic fit, and hereby represent the decline in air flow due to particles being trapped in the filter. This factor, or formula value, is multiplied with the initial flow through a new filter having essentially no particles trapped.

Sub steps 410-430 may be performed in any order.

In a fourth sub step 440, the accumulated particle mass during the sample may then be calculated by multiplying the sample time obtained in step 410, the PM2.5 value obtained in step 420, and the air flow obtained from step 430, i.e. the clean air flow. This value representing the accumulated mass over the sample period may optionally be stored.

In step 500, a total accumulated particle mass over a time T may be determined by means of a summation of the total mass accumulated over the sample period and stored values representing the mass accumulated over previous sample period, if any.

In step 600, the total accumulated particle mass obtained is compared to a reference value from a filter loading test, in the illustrated case a CCM value, in order to determine the utilized capacity of the filter. The CCM value is in the illustrated case chosen based on an acceptable CADR-level, in the exemplary case a 10% reduction has been chosen to illustrate an exemplary acceptable level before the filter has to be changed. In other words, the CCM value represents a mass of particles, i.e. an amount present in the filter when the CADR-level has dropped 10%. Accordingly, the resulting estimation gives the ratio, or degree, of capacity utilized before the filter has to be changed.

In order to provide an estimation of the remaining filter life time, optional step 700, the total days used is first calculated by subtracting the time of the first sample from the current time. The remaining filter lifetime is then estimated by means of a multiplication of the days used and the inverse of the ratio of the total accumulated mass to the reference value followed by a subtraction of the days used. Accordingly, the remaining time before filter change is calculated under the assumption that the remaining period of use will be under operating conditions, i.e. in an environment having the same average PM2.5 concentration.

Any of the steps described in the foregoing may be performed by the circuitry 120 of the air treatment device 100 and/or by the server 200. Similarly, stored data in the form of input, parameters or the like may be stored internally in the air treatment device and/or on the server.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A method for determining a degree of utilized capacity of a filter arranged in an air treatment device adapted to process air present in an ambient volume, wherein said air treatment device comprises a fan adapted to induce an air flow drawn from said ambient volume through said filter, the method comprising:
   determining a total accumulated pollutant amount in the filter; and
   comparing the determined total accumulated pollutant amount in the filter to a reference pollutant amount to determine said degree of utilized capacity, said reference pollutant amount is a pollutant amount present in said filter when said air treatment device produces a predetermined clean air flow;
   wherein the total accumulated pollutant amount in the filter is determined based on:
      data obtained from a sensor arranged to measure a current pollutant concentration in said ambient volume and/or pollutant concentration data indicative of a current pollutant concentration in said ambient volume; and
      an estimated volume of air processed by the air treatment device, said volume being estimated based on a value indicative of a current air flow through said filter.

2. The method according to claim 1, wherein said reference pollutant amount is based on an accelerated pollutant loading test of said filter.

3. The method according to claim 1, wherein said value indicative of the air flow through said filter is at least in part dependent on a value indicative of a current accumulated pollutant amount in said filter.

4. The method according to claim 1, wherein said value indicative of the air flow through said filter is based on data indicative of the performance of said fan.

5. The method according to claim 1, wherein said value indicative of the air flow through said filter is based on data from a sensor arranged to measure said air flow.

6. The method according to claim 1, wherein said total accumulated pollutant amount in the filter comprises at least one of a particle amount or a gas molecule amount.

7. The method according to claim 1, wherein the current pollutant concentration is based on at least one of a particulate matter concentration value or a VOC-concentration value.

8. The method according to claim 1, wherein said estimated volume of processed air is estimated over a certain period of time based on a multiplication of said value indicative of the current air flow through said filter and a length of said period of time.

9. The method according to claim 1, further comprising the step of determining a remaining filter lifetime, wherein the determination of remaining lifetime is based on said current pollutant concentration level being substantially constant during the estimated remaining lifetime.

10. The method according to claim 1, wherein the pollutant concentration data indicative of a current pollutant concentration in said ambient volume is outdoor concentration data representative for a geographical area where the air treatment device is located.

11. The method according to claim 10, wherein the concentration data is collected by an external information provider and transferred to the air treatment device.

12. An air treatment device adapted to process air present in an ambient volume and further adapted to receive a filter, said device comprising:
   a fan adapted to induce an air flow drawn from said ambient volume through said filter; and
   circuitry;
   wherein said circuitry is adapted to execute at least one of:
      determining a total accumulated pollutant amount in the filter; and
      comparing the determined total accumulated pollutant amount to a reference pollutant amount to determine a degree of utilized capacity, said reference pollutant amount being a pollutant amount present in said filter when said air treatment device produces a predetermined clean air flow;
   wherein the accumulated pollutant amount in the filter is determined based on:
      at least one of data obtained from a sensor arranged to measure a current pollutant concentration in said ambient volume or pollutant concentration data indicative of a current pollutant concentration in said ambient volume; and
      an estimated volume of air processed by the air treatment device, said volume being estimated based on a value indicative of a current air flow through said filter.

13. A system comprising:
   an air treatment device adapted to process air present in an ambient volume and further adapted to receive a filter, said device comprising:
      a fan adapted to induce an air flow drawn from said ambient volume through said filter;
      circuitry; and
   a server;
   wherein at least one of said circuitry and said server is adapted to execute at least one of:
      determining a total accumulated pollutant amount in the filter; and
      comparing the determined total accumulated pollutant amount to a reference pollutant amount to determine a degree of utilized capacity, said reference pollutant amount being a pollutant amount present in said filter when said air treatment device produces a predetermined clean air flow;
   wherein the accumulated pollutant amount in the filter is determined based on:
      at least one of data obtained from a sensor arranged to measure a current pollutant concentration in said ambient volume or pollutant concentration data indicative of a current pollutant concentration in said ambient volume; and
      an estimated volume of air processed by the air treatment device, said volume being estimated based on a value indicative of a current air flow through said filter.

* * * * *